US005166487A

United States Patent [19]

Hurley et al.

[11] Patent Number: 5,166,487

[45] Date of Patent: Nov. 24, 1992

[54] COOKING OVEN WITH CONVECTION AND MICROWAVE HEATING

[75] Inventors: James R. Hurley, Weymouth; Timothy J. Norman, Wayland; Paul J. Childs, Swampscott, all of Mass.

[73] Assignee: Tecogen, Inc., Waltham, Mass.

[21] Appl. No.: 452,612

[22] Filed: Dec. 15, 1989

[51] Int. Cl.[5] .......... B23K 15/10

[52] U.S. Cl. .......... 219/10.55 R; 219/10.55 B; 219/10.55 M; 122/4 R; 126/21 A; 126/21 R; 126/110 R

[58] Field of Search .......... 219/10.55 R, 10.55 E, 219/400, 10.55 B, 10.55 M; 126/21 A, 21 R, 93, 110 R; 122/4 R

[56] References Cited

U.S. PATENT DOCUMENTS

| | | | |
|---|---|---|---|
| Re. 31,637 | 7/1984 | Yoshida et al. | 219/10.55 R |
| 2,762,893 | 9/1956 | Long et al. | 219/10.55 |
| 3,320,396 | 5/1967 | Boehm | 219/10.55 |
| 3,440,386 | 4/1969 | Boehm | 219/10.55 |
| 3,479,188 | 11/1969 | Thelen | 219/10.55 |
| 3,680,029 | 7/1972 | Berry | 338/334 |
| 3,716,687 | 2/1973 | Constable | 219/10.55 |
| 3,767,884 | 10/1973 | Osepchuk et al. | 219/10.55 |
| 3,789,178 | 1/1974 | Harben | 219/10.55 |
| 3,810,248 | 5/1974 | Risman et al. | 219/10.55 |
| 3,851,131 | 11/1974 | Johnston et aL. | 219/10.55 |
| 3,884,213 | 5/1975 | Smith | 126/21 A |
| 3,920,944 | 11/1975 | Constable | 219/10.55 M |
| 3,967,590 | 7/1976 | Hays et al. | 122/4 R |
| 4,013,861 | 3/1977 | Westfall | 219/10.55 D |
| 4,081,647 | 3/1978 | Torrey | 219/10.55 D |
| 4,096,369 | 6/1978 | Tanaka et al. | 219/10.55 D |
| 4,097,709 | 6/1978 | Bachtold et al. | 219/10.55 R |
| 4,114,013 | 9/1978 | Simon et al. | 219/10.55 D |
| 4,207,053 | 6/1980 | Turner et al. | 431/59 |
| 4,211,909 | 7/1980 | Yoshida et al. | 219/10.55 R |
| 4,262,183 | 4/1981 | Smith et al. | 219/10.55 R |
| 4,278,862 | 7/1981 | Mizuno et al. | 219/10.55 B |
| 4,308,444 | 12/1981 | Takagi et al. | 219/10.55 B |
| 4,332,992 | 6/1982 | Larsen et al. | 219/10.55 R |
| 4,334,137 | 6/1982 | Takagi et al. | 219/10.55 F |
| 4,337,384 | 6/1982 | Tanaka et al. | 219/10.55 B |
| 4,339,647 | 7/1982 | Inayama et al. | 219/10.55 R |
| 4,349,714 | 9/1982 | Tamano | 219/10.55 A |
| 4,354,083 | 10/1982 | Staats | 219/10.55 F |
| 4,358,653 | 11/1982 | Weiss | 219/10.55 B |
| 4,369,347 | 1/1983 | Shin | 219/10.55 B |
| 4,430,541 | 2/1984 | Day, Jr. | 219/10.55 R |
| 4,450,334 | 5/1984 | Bowen et al. | 219/10.55 E |
| 4,477,706 | 11/1984 | Mittelsteadt | 219/10.55 B |
| 4,480,164 | 11/1984 | Dills | 219/10.55 B |
| 4,481,396 | 11/1984 | Matsubayashi et al. | 219/10.55 B |
| 4,498,453 | 2/1985 | Ueda | 126/21 A |
| 4,508,947 | 4/1985 | Eke | 219/10.55 B |
| 4,598,689 | 7/1986 | Eke | 126/21 A |
| 4,743,728 | 5/1988 | Nagafusa et al. | 219/10.55 R |
| 4,919,120 | 4/1990 | Horikoshi et al. | 126/93 |
| 4,926,837 | 5/1990 | Parker et al. | 219/10.55 R |
| 4,938,203 | 7/1990 | Thrasher et al. | 126/110 R |
| 4,940,869 | 7/1990 | Scholtes | 219/10.55 F |

*Primary Examiner*—Bruce A. Reynolds
*Assistant Examiner*—Tu Hoang
*Attorney, Agent, or Firm*—Fish & Richardson

[57] ABSTRACT

An apparatus for cooking an article is provided including a cooking chamber, a heating means for producing heated gases for introduction into said chamber for convective heating without microwave interference, and a source of microwaves for heating with microwave energy. At least one freely rotating stirring means is positioned in gas and microwave communication with the heating chamber, and is caused to rotate from a flow of the heated gases. The stirring means serves to distribute both microwave energy and the heated gases about the chamber for uniform, simultaneous convection and microwave heating. A pilotless gas source is provided which includes an initiation chamber within a combustion chamber. The initiation chamber is positioned by a microwave opaque material and includes a flame sensor which eliminates the flow of gas in the combustion chamber when no flame is present.

17 Claims, 5 Drawing Sheets

TOP VIEW

COOLING AIR FLOW SCHEMATIC

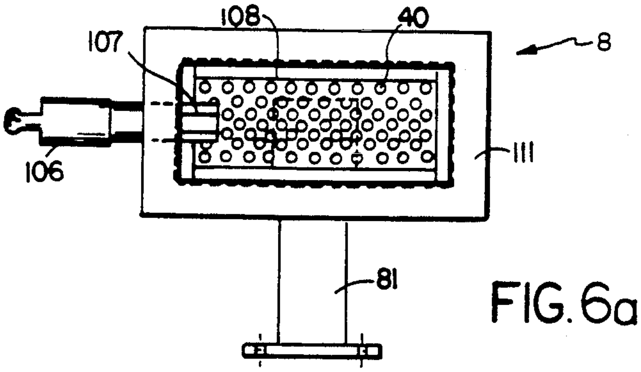
FIG. 6a
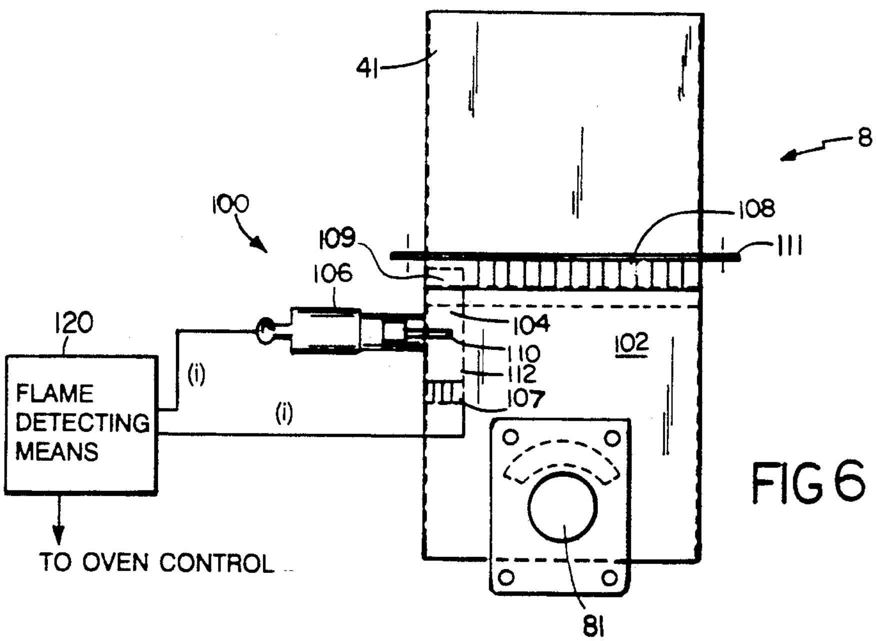
FIG 6
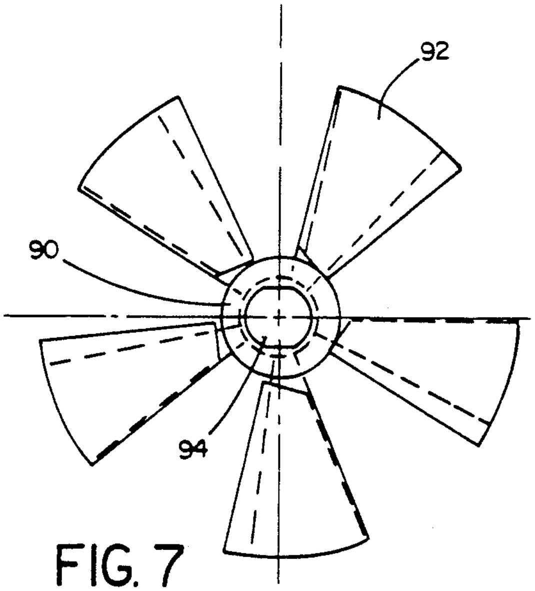
FIG. 7
FIG. 7a
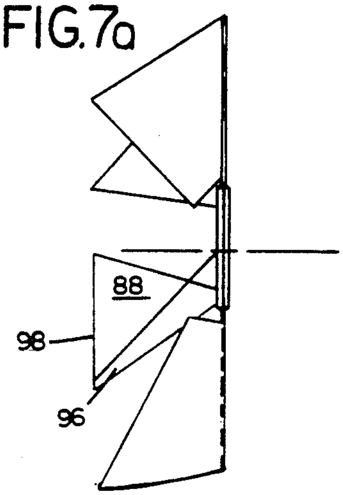

COOKING OVEN WITH CONVECTION AND MICROWAVE HEATING

FIELD OF THE INVENTION

This invention relates to cooking apparatus and more particularly to cooking apparatus including microwave and convection heating means.

It is known to use a combination of microwave and convectional heating for cooking a food article. The advantage of such combination cooking ovens is that the cooking time may be significantly reduced by internal heating of a food article by application of the microwave energy while a desired texture and appearance may be achieved on the exterior of the article through the convection heating. A gas burner may be used as a source of hot gases for convectional heating.

In microwave ovens, distribution of microwave energy can be accomplished by directing such energy from its source to a microwave mode stirrer which is typically a motor-driven rotating fan with microwave reflective fins. Microwaves reflected at various angles from the fins are then directed into the cooking cavity.

Distribution of heated gases in convection cooking can be accomplished by circulation of heated gases through the cooking chamber, also with a motor-driven rotating fan.

SUMMARY OF THE INVENTION

In the first aspect, the invention features an apparatus for cooking an article that has a cooking chamber wherein the article is positioned, a heating means that produces heated gases for convectively heating the article, and a source of microwaves for heating the article with microwave energy. At least one freely rotating stirring means is positioned in gas and microwave communication with the heating chamber. The stirring means is caused to rotate from a flow including the heated gases, and is formed from a microwave reflective material. The stirring means serves to mix both the microwave energy and the heated gases for uniform, simultaneous convection and microwave heating.

In various embodiments: the apparatus further includes a motor driven fan disposed adjacent to and communicating with the chamber for directing a flow of the gases for rotating the stirrers and exhaust means for exhausting a portion of the gas from the chamber; the gas flow is introduced directly into the chamber from the source; the stirrer and fan are positioned in a duct space formed by baffle means positioned between the stirrers and fan and the food article, the duct space forming a conduit for directing the gases for rotating the stirrers; the microwave energy is directed to the stirrer before introduction to the chamber; the apparatus includes two stirrer means disposed at opposite ends of the chamber and two microwave sources each adapted to direct the microwave energy to one of the stirrers before entering the chamber; the portion of the baffle means positioned between the stirrer and the food article is formed of a microwave opaque material and includes through cut slots wherein at least one dimension of the slots is equal to or greater than one quarter the wavelength of the microwaves; the portion of the baffle means positioned between the stirrer and the food article is formed of a microwave transparent material; the baffle means positioned between the stirrer and the food article includes a microwave window; the stirrer is formed of a plurality of fins, each fin being formed of a first and second panel piece angularly connected along a line for forming a flow catch therebetween; the angle made at the line by the fin panels is 45°; the stirrer has five fins; the heating means includes a gas burner.

In another aspect, the invention features a method for cooking an article, including providing a chamber for heating the article, convectively heating the article with a heated gas flow, heating the article with microwave energy and mixing the heated gas flow and the microwave energy with a freely rotatable stirring means positioned in microwave and gas communication with the chamber, the stirring means being in the path of a flow including at least some of the heated gas for being driven therefrom, and in the path of the microwave energy, for providing uniform mixing of microwave energy and heated gases for simultaneous microwave and convection cooking.

In various embodiments: the method further includes providing a motor driven fan in gas communication with the chamber and the heated gases, drawing the gases into the fan, and driving the gases to the stirrers for rotating the stirrers with the fan; introducing the gases into the chamber before the driving; directing the microwaves to the stirrers before introducing into the chamber; mixing the gases and the microwaves in a mixing chamber including the stirrers before introducing into the heating chamber.

In another aspect, the inventions features a pilotless gas burner for a combination gas and microwave oven, including a combustion chamber for containing a flow and burning a combustible gas mixture the chamber being in gaseous communication with a source of microwave energy, and within the combustion chamber, an initiation chamber in gaseous communication with the combustion chamber, being partitioned by a microwave opaque material and including a flame sensor and a spark initiation means, the flame sensor being adapted to sense the presence or absence of combustion in the combustion chamber and eliminate the flow of the gas mixture in the absence and the spark initiation means adapted to initiate the combustion from within the initiation chamber.

In various embodiments: the initiation means is a spark plug; the initiation means is a single electrode spark plug and the flame sensor measures the current flow between the electrode and a wall of the initiation chamber; the initiation chamber is partitioned with a metal; the flow of combustion gases about the initiation chamber are controlled to control the temperature of the chamber; the initiation chamber includes apertures for the passage of gasses sized small enough to prevent substantial entry of microwave energy.

In yet another aspect, the invention features a method for controllably providing heated combustion gasses in a microwave heating cavity. The method includes flowing a combustible gas mixture in a chamber being in gaseous and microwave communication with the cavity and partitioning a region of the chamber with a microwave opaque material and providing therein a flame sensor and a spark initiation means in gaseous communication with the chamber, the flame sensor being adapted to sense the presence or absence of combustion in the chamber and eliminate the flow of the gas mixture in the absence and the spark initiation means adapted to initiate the combustion in the chamber from within the region and at a position upstream of the region. The method may further include controlling the temperature of the microwave opaque material by controlling the flow rate of the gas mixture in the chamber.

BRIEF DESCRIPTION OF THE DRAWINGS

FIG. 6 is a front view of a preferred embodiment of a pilotless gas heater according to the invention.

FIG. 6*a* is a top view of the heater of FIG. 6.

FIG. 7 ane 7*a* are, respectively, front and side views of a preferred embodiment of a mode stirrer of the invention.

DETAILED DESCRIPTION

Figure 1:
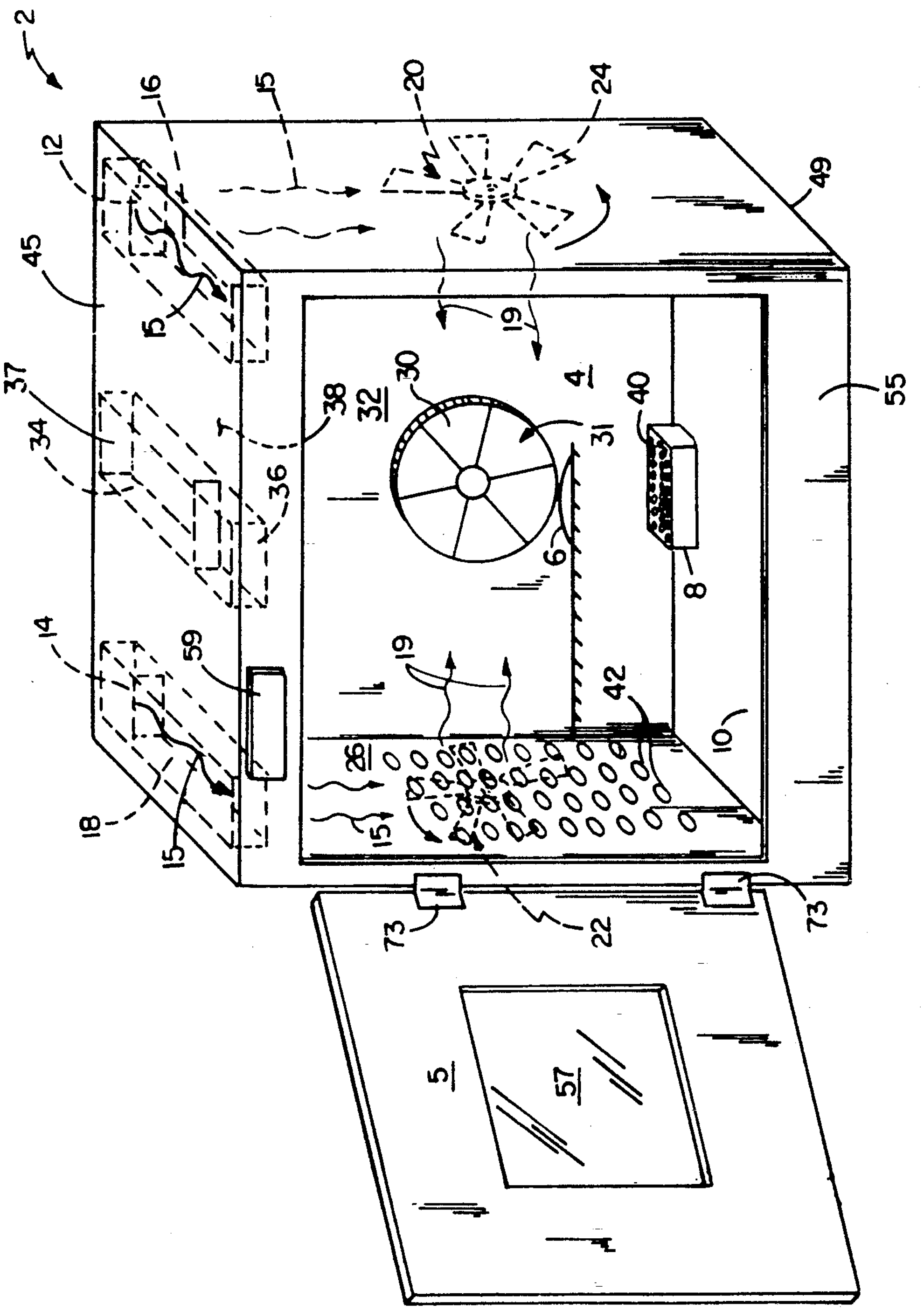
FIG. 1 is a perspective view of a microwave/convection oven according to the invention, showing the path of microwave energy.
Figure 2:
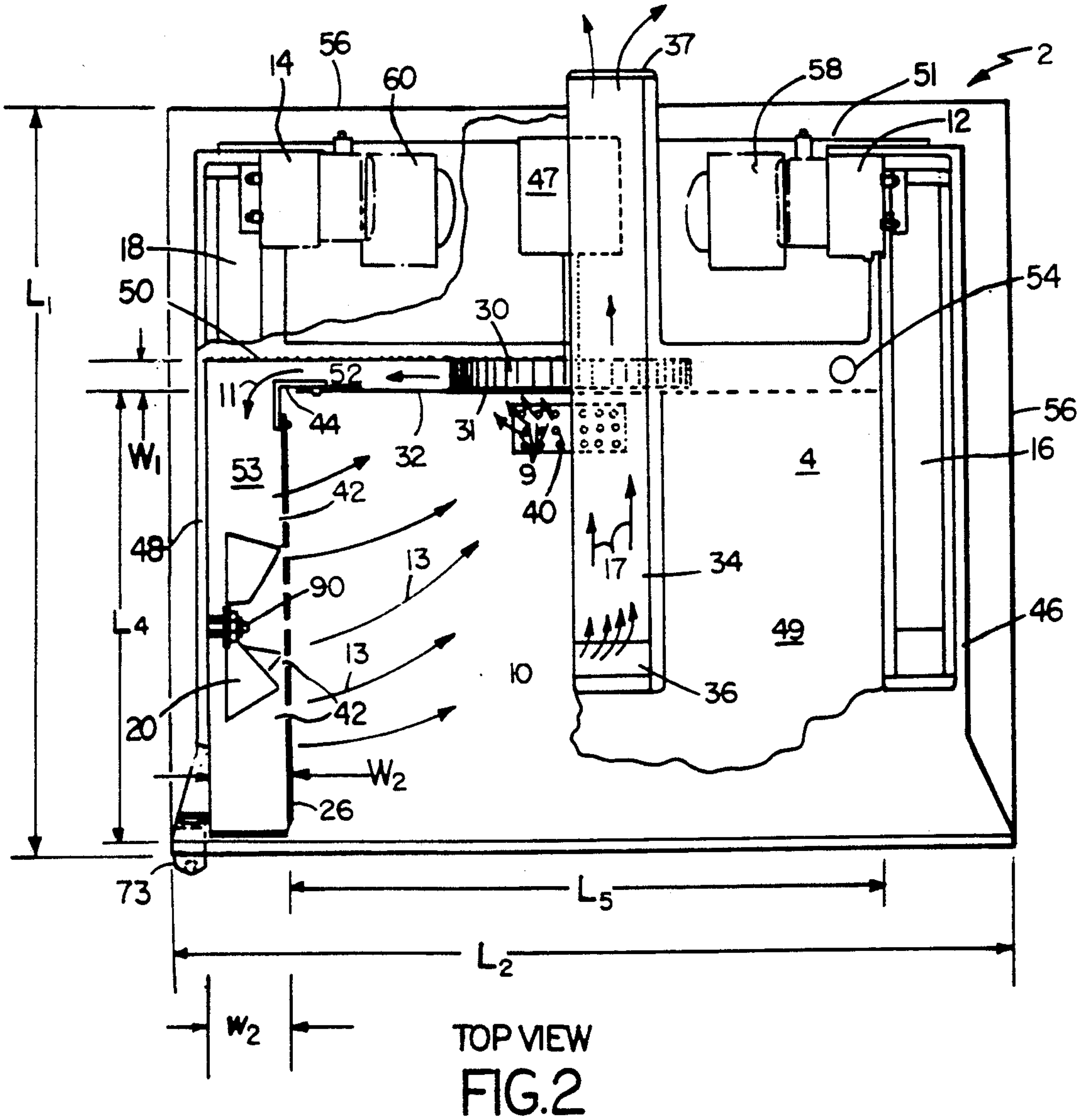
FIG. 2 is a partial cutaway top view of an embodiment of the invention showing the path of heated gas flow.

Referring to the figures in general and more particularly to FIGS. 1 and 2, an embodiment of the invention is shown including the flow of microwave energy (FIG. 1) and heated convection gases (FIG. 2). The oven 2 for microwave and convectional cooking provides a heating chamber 4 which may be accessed through the door 5 for positioning a food article 6 therein, for example, on a rack. A source 8 of heated convectional gases extends from beneath the floor panel 10 into the chamber and, is preferably a gas heater to be described in more detail below. Microwave energy is generated from a pair of magnetrons 12, 14 to which waveguides 16, 18 are attached as known. Positioned on opposite sides and in microwave and gas communication with the chamber are stirrer means, shown only schematically in FIG. 1 as 20, 22, which are freely rotatable and include stirring blades 24.

Figure 4:
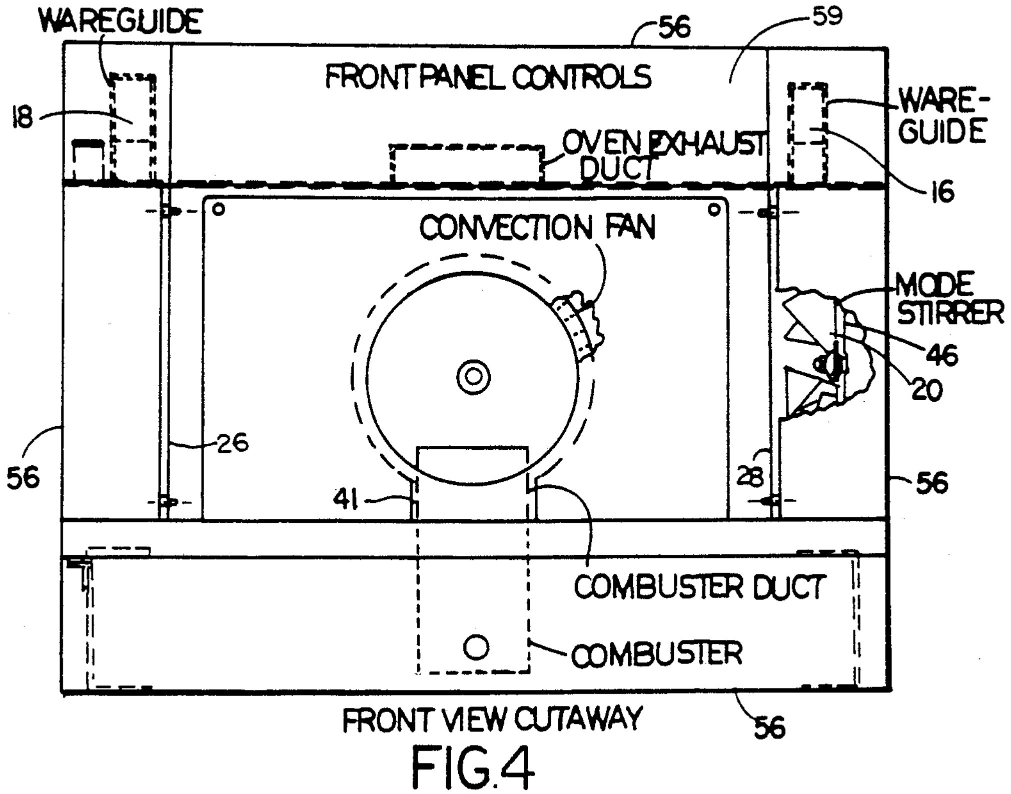
FIG. 4 is a partial cutaway front view of the oven of FIG. 2.

Referring particularly to FIG. 2, the stirrers 20, 22 are placed in a duct space 53, formed between chamber baffle walls 26, 28 and the side support walls 46, 48 (also see FIG. 4). A duct space 52 communicates with a duct space 53 and is defined between the chamber back wall 32 and a rear duct wall 50 (FIG. 2). Included therein is a circulating fan 30 which accesses the interior of the chamber 4 through an aperture 31 in the back wall 32 of the chamber. An exhaust duct 34, accesses the chamber 4 through the opening 36 in the chamber top panel 38 and exhausts flow to the rear of the apparatus through vent 37.

During cooking, the food article may be heated alternately or simultaneously with microwave energy and heated gases. As shown more clearly in FIGS. 2 and 3 hot combustion gases from source 8, shown schematically by arrows 9, enter the cooking chamber 4 through apertures 40 in the extension portion 41 within the chamber and adjacent to the fan. The hot combustion gases along with other residual gases from the chamber 4 are drawn through aperture 31 and into the fan 30 which is rotated by a motor 47. The gases entering the fan are driven by the action of the fan and directed by duct spaces 52, 53 behind the rear wall 32 and baffle walls 26, 28 as indicated schematically by arrows 11, (FIG. 2) whereby the freely rotating stirrers 20, 22 are rotated by the flow.

The gases enter the chamber 4 through baffle slots 42 in walls 26, 28 as indicated by arrow 13. The rotation of the stirrers 22, 24 and the turbulence of flow through baffles slots 42 (see FIG. 3) provides uniformly mixed gases for introduction in the chamber 4 and distribution about the food article 6 resulting in an even convectional heating. During the cooking of the article as described, a portion of the gases denoted by arrow 17 within the chamber 4 are exhausted through duct 34 from aperture 36 to the rearwards of the device by vent 37.

Referring back now to FIG. 1, magnetrons 12, 14 generate microwave energy denoted schematically as 15 which is directed by waveguides 16, 18 toward the stirrers 20, 22 at which point the stirrers, formed of a microwave reflecting material and rotating by means of the gas flow as discussed above, reflect the microwave energy within the duct space 53 thereby providing a distribution of energy for introduction into the chamber 4 through baffle slots 42 in baffle walls 26, 28. The rotation of the stirrers 22, 24 may enhance the uniform distribution of microwave energy denoted by arrows 19 about food article 6.

Thus, the present invention provides premixing of both the microwave energy and the heated gases for introduction to the chamber for providing uniform heating, using freely rotatable stirring means driven by the flow of the gases generated at the heater.

Figure 3:
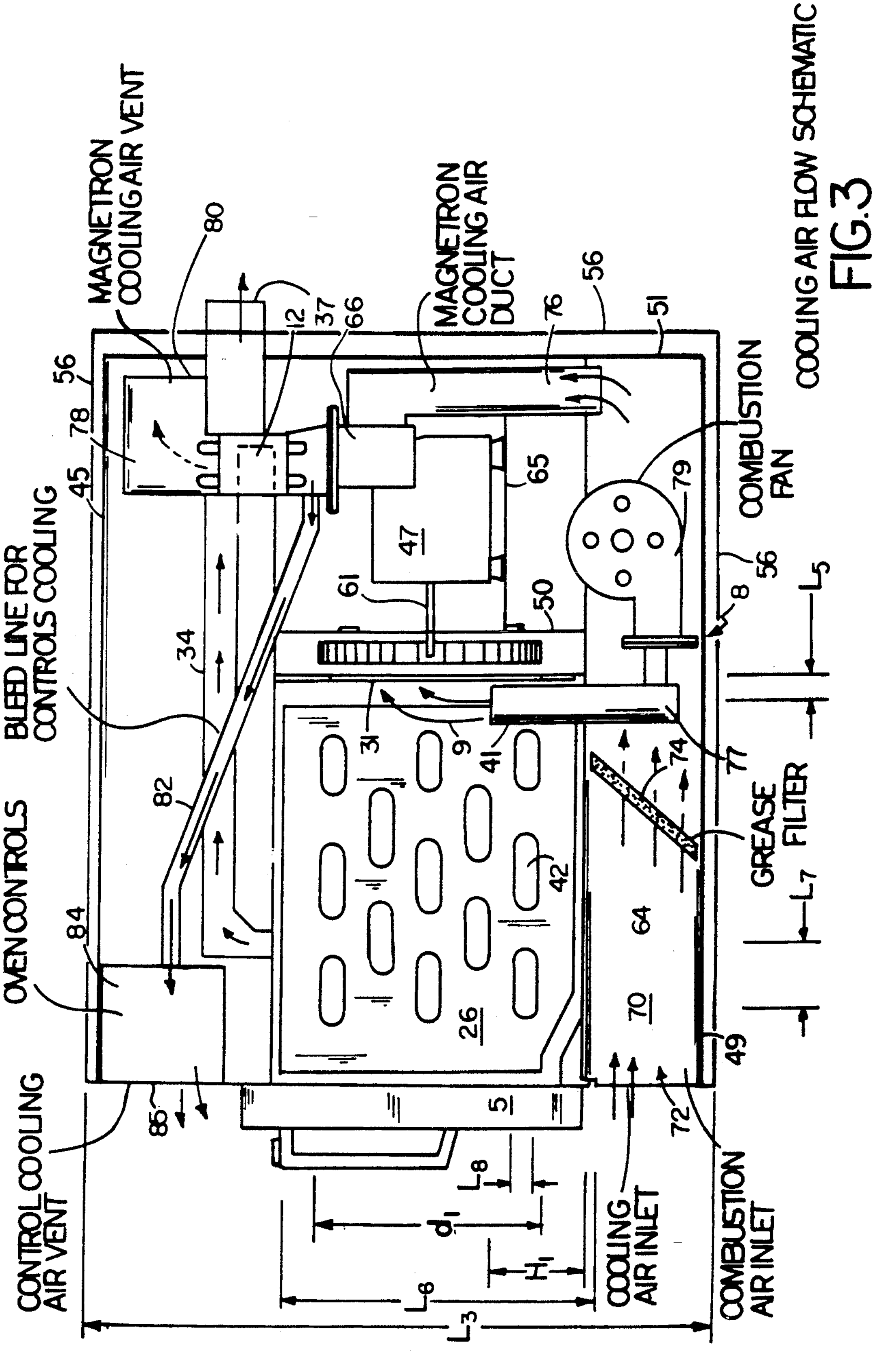
FIG. 3 is a partial cutaway side view of the oven of FIG. 2 with the side panel removed.

Referring now to FIGS. 2 and 3, the device encloses its components in a support box having a sheet metal skin 56 (not shown in schematic FIG. 1) with an overall depth of, $L_1$ about 28.75 inches, a width, $L_2$ of about 31.5 inches. The height $L_3$, (FIG. 3) is about 24 inches. The side support walls 46. 48 and top. bottom, and rear panels 45, 49, 51 (also. FIG. 1) respectively, as well as front panel frame 55 are typically formed of microwave opaque material such as a sheet metal of various thickness and cut to include apertures for various components, connections and the like. At the front of the device, above the door 5 a control panel 59 is provided (FIGS. 1 and 4) whereby operation controls and timers ma be positioned for easy access by the user. The door 5 is hinged to the frame 55 by hinge members 73 and may optionally include a window 57 of microwave opaque material such as perforated sheet metal as is known, and a handle with an interlock mechanism mating in the frame.

The cooking chamber 4 has a volume of 2.75 cubic feet; chamber dimensions being $L_4$, about 16 inch, $L_5$, about 23 inch, and $L_6$, about 13 inch. Referring particularly now to FIG. 2 the baffle walls 26, 28 and rear wall 32 are preferably supported by bracket means 44 and are positioned opposite support walls 46, 48 and a rear wall 50 which separates the chamber from various power components in the rearward of the device. The duct space 52 is formed between the rear wall 32 and chamber wall 50 where the fan 30 is positioned, and continues to space 53, between support walls 48 and baffle walls 26 where the stirrers 20, 22 are positioned. The width of the space 52 is, $W_1$ approximately 1.5 inches and that of space 53 is about $W_2$, 2.75 inches (FIG. 2). Duct space 52, 53 direct the flow of combustion gases from the circulation fan 30 to the stirrers 20, 22 as described above. The temperature of the gases within space 52 are measured by means of an RTD 54.

The rear chamber wall 32 includes a circular aperture 31, substantially of equal diameter, $d_1$ of the fan 30, about 9 inches, and is optionally formed of a microwave opaque material, preferably a metal. Baffle walls 26, 28, shown more clearly in FIG. 3, include baffle slots 42, preferably elongated in shape. The slots provide a dimension, (FIG. 3) $L_7$, greater than or equal to one fourth the wavelength of the microwaves, in this embodiment, about 1.2 inches. The small dimension $L_8$, is about 1.0 inch. The baffle walls themselves are formed of microwave opaque metal.

Microwaves are introduced to the chamber through slots 42 as is the gas flow. This arrangement enables the duct space 53 to act as a cavity for mixing the energy by reflection from the stirrers and the duct walls before exiting through the slots. In other embodiments, however, the entire baffle wall or a portion of the baffle wall is made microwave transparent to form a microwave window for facilitating the introduction of this energy, reflected from the stirrers, into the chamber. Alternatively, the baffle walls 26, 28 and the rear wall 32 may be removed entirely.

The top panel 38 of the chamber is also preferably microwave opaque, and includes the rectangular aperture 36 of approximately 6 inches by 1.5 inches to which exhaust duct 34 is attached for leading exhaust gases rearward and out of the device through an aperture in the back support.

As shown in FIG. 3, the circulation fan 30 comprises a centrifugal fan driven through a shaft 61 extending through the rear chamber wall 50 from the motor 47 positioned on a motor support 65 in the rearwards compartment of the device cavity. The shaft 61 includes, a choke (not shown) to the back of rear chamber wall 50. The motor includes its own drive electronics for providing power and controlling the motor.

Adjusting the speed of the motor allows selective adjustment of the flow of gas currents within the chamber 4 for optimum cooking conditions. For example, the motor 47 may be a two speed motor which produces a high speed rotation of 1725 rpm and low speed rotation of 1150 rpm. The lower speed generally produces superior baking characteristics of delicate food articles such as a meringue which might be deformed by currents during the early stages of cooking when the article is still soft. After solidification of the article, higher speeds might be used. The fan speeds are also selected to provide sufficient circulation to avoid overheating the ducts 52, 53 while the burner 8 is operating.

Magnetrons, 12, 14, preferably output microwave energy at 2,450 MHz and a total power of about 700 Watts each, total power 1400 Watts. As shown most clearly in FIGS. 2 and 5, the magnetrons are powered through high voltage transformers 58, 60 coupled to capacitors 62, 64 and cooled by separate, motor driven cooling fans 66, 68. The magnetrons are preferably positioned rearward and at opposite ends of the cooking chamber.

Referring in particular to FIG. 3, air for magnetron cooling is drawn through an inlet 72 and a duct 70 beneath the chamber 4, in which a grease filter 74 is positioned for removing particulates and the like and finally passes to the magnetron cooling duct 76 from which it is drawn into the magnetron fans 66, 68 (FIG 5) and blown through magnetron 12 (FIG. 3). The magnetron cooling air may be exhausted through a separate duct 78 and vent 80 in the rearwards part of the oven. A portion of the cooling air is also directed via bleed line 82 to the oven controls chamber 84 at the front of the apparatus for cooling electrical control components. Cooling air in this case is vented through a vent 85 in the frontwards part of the oven. It should be evident from the discussion above that the cooling air for the magnetrons and control panels follows a separate isolated path from the heated gases used for convection cooking in the chamber 4.

It is a particular feature of the present invention that hot combustion gases are substantially ingested directly from the chamber 4 into the convection fan where they are mixed with the returning cooler air from the oven. The combustion gases thus heat the chamber gases. The warm air mixture is then directed through duct space 52, 53 over the stirrers. The airstream propels the mode stirrers to rotate, thereby stirring the microwave energy field to promote evenness of microwave heating. The warm gases similarly leave the stirrers and enter the cooking zone via the baffle slots and heat the food articles. A portion of these gases, cooled by convection heating of the food article, is then exhausted. A portion of the gases is also returned to the convection fan where it is again mixed with the hot combustion gases and recirculated.

Figure 5:
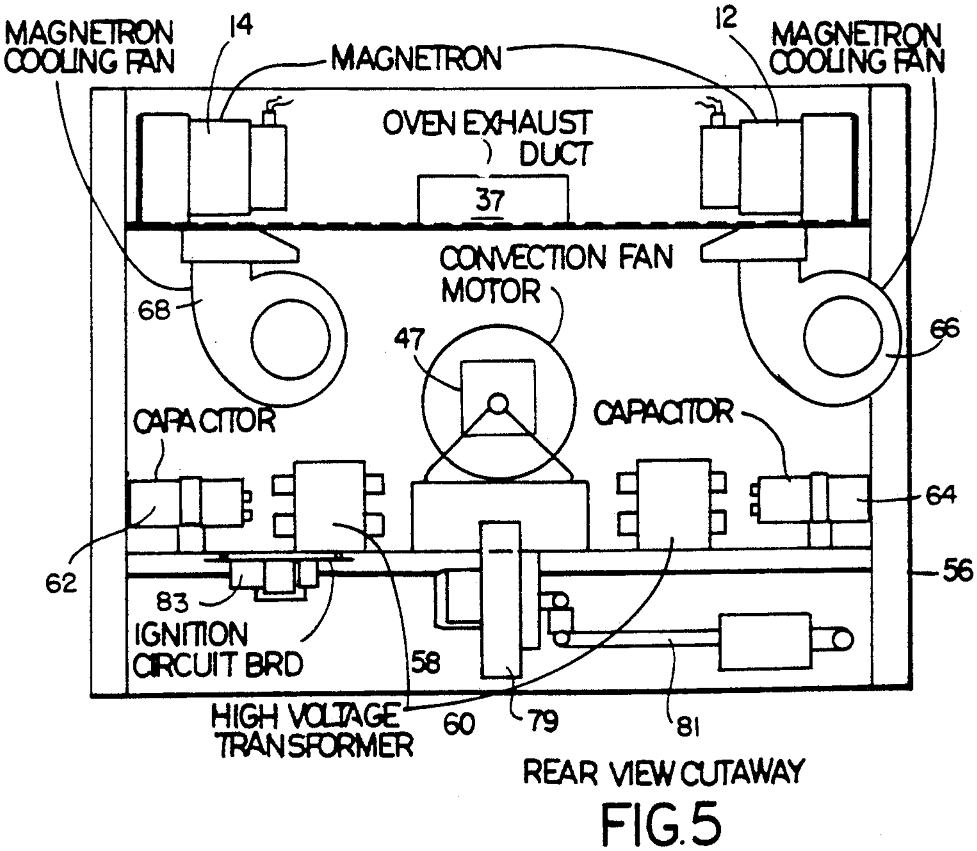
FIG. 5 is a back view of the oven of FIG. 2 with the rear panel removed.

Referring now especially to FIGS. 3 and 5, the gas combustion heater includes a rectangular combustion region 77 in which air from a separate motor driven combustion fan 79 and a combustible gas, preferably, natural gas, methane or propane, drawn from a supply through supply network, 81 (FIG. 5) are ignited and combusted. Ignition is controllable from a controlling mechanism at the front panel controls which activates the ignition circuit 83 on demand or in response to a thermostat setting where the temperature is measured, for example, at RTD 54.

The combustion section includes a ductwork extension portion 41 which extends a height, $H_1$, 3.5 inches into the chamber and is separated from the back wall 32 of the chamber by a distance, $L_5$ of about 1.25 inches (distance from center of duct work 41 to wall 32). This close proximity of the combustion chamber to the fan 30 assures a majority of the gases from the source will be drawn in for mixing in duct space 52, 53 and by stirrers 20, 22 before entry into chamber 4.

In a preferred embodiment, the source of combustion gasses is a pilotless gas combustor with a spark ignition and a means for detecting the presence of a flame. The combustor makes it possible to position the source in the presence of microwave energy and in close communication within the fan 30. As shown in detail in FIG. 6 and 6*a*, the pilotless ignition system 100 includes a main chamber 102 within which there is provided an initiation chamber 104. The chamber 104 includes a microwave opaque, conducting wall 112, a burner tile inlet 107, an outlet 109 and a sparkplug 106 with plug electrode 110. A flange 111 allows the heater to be secured on the underside of the floor panel 10 of the cooking chamber 4 so that the duct 41 extends into the chamber 4.

In operation, when the oven temperature controller calls for heat, the gas and combustion air mixture enters the main chamber 102. A portion of this mixture enters the base of the initiation chamber 104 through burner tile inlet 107 and a spark from the sparkplug 106 ignites the mixture to form a flame. The flame then ignites the bulk of the gas-air mixture upstream of the spark plug, near the exit 109 of the initiation chamber 104 and as it leaves the main chamber 102 near the burner tile 108. Care is taken in the design not to allow preignition of the bulk gas in the main chamber, i.e., behind the initiation chamber burner tile 107 or main chamber burner tile 108. This is accomplished by controlling the flow of the combustor gas mix in the main chamber 102 such that heat transfer keeps temperatures of the initiation chamber walls well below the ignition temperature. It is important to avoid combustion in the main chamber up stream of the burner tile 108 to avoid damage of the chamber, tiles and the like.

Flame sensing is accomplished by detecting the flow of ionized gases generated in the flame by measuring the current flow between the spark plug electrode 110 and the wall 112 of the initiation chamber. So long as a flame exists in the main chamber (as verified by the current), the burner remains alight. When the temperature in the oven is satisfied, e.g., by the thermostat measurement, the oven control shuts the gas valve off and the flame is extinguished.

Microwaves are prevented from entering the region around the flame sensor to avoid the safety hazzard of false proof of-flame readings that cause combustible gas to flow into the chamber. The initiation region 104 is made microwave free by constructing the walls of the chamber 104 (about 2 inches long) from high temperature resistant, microwave-opaque metal. Using generally more heat sensitive materials such as metals to isolate the flame sensor for microwaves is made possible by controlling the gas flow in the main chamber 102 to create a cooling effect on the skin. Further, the dimensions of the initiation chamber skin at the inlet burner tile 107 and outlet 109 define an opening that is too small (½ inch by ½ inch) for substantial entry of microwaves from the magnetron source (preferably 2,450 MHz). In this way, the initiation chamber 104 and flame sensor are isolated from the microwave energy, and the convection heater may extend into the heating chamber 4, as described.

Referring now to FIGS. 7 and 7*a*, an expanded view of the stirrer designs are shown. The stirrers include an annular core 90 supporting a plurality of fins 92 and freely rotatable on a support pin 94. The fins in turn are constructed of a pair 96, 98 of panel pieces and attached along the line forming a flow catch or turbine bucket 88. In preferred embodiments, the fin panels 96, 98 are formed of metal and the pin 94 is in turn held stationary to the side support walls 46, 48 by means of welding. The angle between the pieces maybe, for example, 45°. It is a feature of these stirrers that they may be efficiently propelled by gas flow into path 88 and efficiently mix gas and microwaves by reflections from and between both panel pieces 96, 98.

Other modifications and variations of the present invention are also possible when considered in the light of the above teachings. It is therefore understood that the scope of the present invention is not to be limited to the details disclosed herein, but may be practiced otherwise than as specifically described. For example, cooking uniformity can be enhanced in some cases by removal of the baffles 26, 28, and 32.

Other embodiments are within the claims. We claim:

1. An apparatus for cooking a food article comprising:

a cooking chamber wherein said article is positioned during cooking, convection heating means for producing heated convection gases for introduction into said cooking chamber for convection heating said article, microwave heating means including a source of microwaves for heating said article with microwave energy, and heating energy mixing structure, including at least one freely rotating stirring means for communication with and mixing of heated convection gases and microwave energy within said cooking chamber, and circulation means for generating a flow including said heated convection gases toward said stirring means for causing said stirring means to rotate from said flow including said heated convection gases, said stirring means operable to direct said flow including heated convection gases into said cooking chamber and being formed from a microwave reflective material for mixing both said microwave energy and said heated convection gases for uniform, simultaneous convection and microwave heating.

2. The apparatus of claim 1 further comprising a motor driven fan, disposed adjacent to and communicating with said cooking chamber for directing said flow including said heated convection gases for rotating said stirring means, and exhaust means for exhausting a portion of said heated convection gases from said cooking chamber.

3. The apparatus of claim 2 wherein said flow including said heated convection gases is introduced directly into said cooking chamber from said convection heating means.

4. The apparatus of claim 2 wherein said stirring means and motor driven fan are positioned in a duct space formed by baffle means, said baffle means positioned between said stirring means and motor driven fan and said food article, said duct space forming a conduit for directing said heated convection gases for rotating said stirring means.

5. The apparatus of claim 4 wherein said microwave energy is directed to said stirring means before introduction to said cooking chamber.

6. The apparatus of claim 4 wherein said stirring means is disposed at opposite ends of said cooking chamber and two microwave sources are provided, each adapted to direct said microwave energy to one of said stirring means before entering said cooking chamber.

7. The apparatus of claim 4 wherein a portion of said baffle means positioned between said stirring means and said food article is formed of a microwave opaque material and includes through cut slots wherein at least one dimension of said slots is equal to or greater than one quarter the wavelength of microwaves.

8. The apparatus of claim 4 wherein the portion of said baffle means positioned between said stirring means and said food article is formed of a microwave transparent material.

9. The apparatus of claim 4 wherein said baffle means positioned between said stirring means and said food article includes a microwave window.

10. The apparatus of claim 1 wherein said stirring means is formed of a plurality of fins, each fin being formed of a first and second panels angularly connected along a line for forming a flow catch therebetween.

11. The apparatus of claim 8 wherein an angle made at said line by said panels is 45°.

12. The apparatus of claim 9 wherein said stirring means has five fins.

13. The apparatus of claim 1 wherein said convection heating means includes a gas burner.

14. An apparatus for cooking a food article comprising:

a cooking chamber wherein said article is positioned during cooking, convection heating means for producing heated convection gases for introduction into said cooking chamber for convection heating said article, microwave heating means including a source of microwaves for heating said article with microwave energy, and heating energy mixing structure, including at least one freely rotating stirring means positioned for communication with and for mixing of heated convection gases and microwave energy within said cooking chamber and said stirring means formed of a plurality of fins of microwave reflective material forming a flow catch, circulation means for generating a flow including said heated convection gases toward said stirring means for causing said stirring means to rotate from said flow including said heated convection gases, said circulation means including a motor driven fan in communication with said cooking chamber and disposed adjacent said cooking chamber in a duct space formed by baffle means which is positioned between said stirring means and said motor driven fan and said food article, said duct space forming a conduit for directing said flow including said heated convection gases for rotating said stirring means, and microwave energy directing means for directing said microwave energy to said stirring means before introduction to said cooking chamber, said stirring means operable to direct said flow including heated convection gases into said cooking chamber and being formed from a microwave reflective material for mixing both said microwave energy and said heated convection gases for uniform, simultaneous convection and microwave heating.

15. The apparatus of claim 14 further including a pilotless gas burner including a combustion chamber for containing a flow and burning a combustible gas mixture, said combustion chamber being in gaseous communication with said cooking chamber, and within said combustion chamber, a flame sensor adapted to sense the presence or absence of combustion in said combustion chamber and eliminate the flow of said combustible gas mixture in said absence of combustion, said flame sensor includes an initiation chamber in gaseous communication with said combustion chamber, spark initiation means for initiating combustion from within said initiation chamber, and a partition of microwave opaque material for protecting said flame sensor from exposure to said microwave energy.

16. The apparatus of claim 15 wherein said spark initiation means is a spark plug having a single electrode and said flame sensor is operable to measure current flow between said electrode and a wall of said initiation chamber.

17. The apparatus of claim 15 or 16 wherein said initiation chamber includes apertures to prevent substantial entry of microwave energy into said initiation chamber.

* * * * *